(12) United States Patent
He et al.

(10) Patent No.: US 11,523,457 B2
(45) Date of Patent: Dec. 6, 2022

(54) DRX GROUPS FOR CARRIER AGGREGATION

(71) Applicant: QUALCOMM Incorporated, San Diego, CA (US)

(72) Inventors: Linhai He, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 16/452,471

(22) Filed: Jun. 25, 2019

(65) Prior Publication Data

US 2020/0045768 A1 Feb. 6, 2020

Related U.S. Application Data

(60) Provisional application No. 62/712,914, filed on Jul. 31, 2018.

(51) Int. Cl.
*H04W 76/28* (2018.01)
*H04W 52/02* (2009.01)

(52) U.S. Cl.
CPC ....... *H04W 76/28* (2018.02); *H04W 52/0229* (2013.01)

(58) Field of Classification Search
None
See application file for complete search history.

(56) References Cited

U.S. PATENT DOCUMENTS

| 2011/0170420 | A1* | 7/2011 | Xi | H04W 76/28 370/241 |
| 2015/0195867 | A1* | 7/2015 | Koc | H04W 76/15 370/311 |
| 2016/0073447 | A1* | 3/2016 | Rune | H04W 76/28 370/311 |
| 2016/0081020 | A1* | 3/2016 | Rahman | H04W 24/10 370/311 |
| 2016/0192433 | A1* | 6/2016 | Deenoo | H04W 72/046 370/329 |
| 2017/0111956 | A1* | 4/2017 | Koc | H04W 76/28 |
| 2017/0331610 | A1* | 11/2017 | Miao | H04L 5/001 |

(Continued)

FOREIGN PATENT DOCUMENTS

| WO | 2014021984 A1 | 2/2014 |
| WO | 2016163656 A1 | 10/2016 |
| WO | 2016163665 A1 | 10/2016 |

OTHER PUBLICATIONS

International Search Report and Written Opinion—PCT/US2019/039574—ISA/EPO—dated May 8, 2020.

(Continued)

*Primary Examiner* — Diane L Lo
(74) *Attorney, Agent, or Firm* — ArentFox Schiff LLP

(57) ABSTRACT

Aspects presented herein provide an enhanced power management solution, such that an apparatus may configure a UE with more than one DRX configuration for different cells. The apparatus determines a configuration of a plurality of discontinuous reception (DRX) groups for communicating with a UE. The apparatus configures the UE with a first DRX group for a first set of serving cells. The apparatus configures the UE with a second DRX group for a second set of serving cells.

35 Claims, 14 Drawing Sheets

(56) References Cited

U.S. PATENT DOCUMENTS

| | | | | |
|---|---|---|---|---|
| 2017/0339744 | A1* | 11/2017 | Latheef | H04W 76/28 |
| 2017/0367045 | A1* | 12/2017 | Rahman | H04W 76/15 |
| 2018/0070406 | A1* | 3/2018 | Chen | H04W 72/005 |
| 2020/0029302 | A1* | 1/2020 | Cox | H04W 56/0015 |
| 2020/0245395 | A1* | 7/2020 | Zhang | H04L 5/0053 |

OTHER PUBLICATIONS

Qualcomm Inc: "DRX Group for Carrier Aggregation", 3GPP TSG-RAN WG2 Meeting #105, 3GPP Draft; R2-1901766 DRX Group for Carrier Aggregation, 3rd Generation Partnership Project (3GPP), Mobile Competence Centre, 650, Route Des Lucioles, F-06921 Sophia-Antipolis Cedex, France, vol. RAN WG2, No. Athens, Greece; Feb. 25, 2019-Mar. 1, 2019, Feb. 15, 2019 (Feb. 15, 2019), pp. 1-2, XP051603116, Retrieved from the Internet: URL: http://www.3gpp.org/ftp/tsg%5Fran/WG2%5FRL2/TSGR2%5F105/Docs/R2%2D1901766%2Ezip [retrieved on Feb. 15, 2019] the whole document.

Samsung: "Discussion on Single MAC and Dual MAC", 3GPP TSG-RAN WG2 Meeting #84, 3GPP Draft; R2-133865 Interenb CA Singlemac or Dualmac, 3rd Generation Partnership Project (3GPP), Mobile Competence Centre; 650, Route Des Lucioles; F-06921 Sophia-Antipolis Cedex; France, vol. RAN WG2, No. San Francisco, USA; Nov. 11, 2013-Nov. 15, 2013, Nov. 13, 2013 (Nov. 13, 2013), 4 Pages, XP050736702, Retrieved from the Internet: URL: http://www.3gpp.org/ftp/Meetings_3GPP_SYNC/RAN/RAN2/Docs/ [retrieved on Nov. 13, 2013] the whole document.

Yu Y-P., et al., "Traffic-Based DRX Cycles Adjustment Scheme for 3GPP LTE Systems", 2012 IEEE 75th Vehicular Technology Conference (VTC Spring 2012): Yokohama, Japan, May 6-9, 2012, IEEE, Piscataway, NJ, May 6, 2012 (May 6, 2012), pp. 1-5, XP032202553, DOI: 10.1109/VETECS.2012.6240136, ISBN: 978-1-4673-0989-9 the whole document.

* cited by examiner

DRX GROUPS FOR CARRIER AGGREGATION

CROSS REFERENCE TO RELATED APPLICATION(S)

This application claims the benefit of U.S. Provisional Application Ser. No. 62/712,914, entitled "DRX Groups For Carrier Aggregation" and filed on Jul. 31, 2018, which is expressly incorporated by reference herein in its entirety.

BACKGROUND

Technical Field

The present disclosure relates generally to communication systems, and more particularly, to discontinuous reception (DRX).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In wireless communications, base stations and a User Equipment (UE) send different notification and paging signals to each other in order to facilitate communication. These signals can help to improve the overall communication as well as the access and control of each device within the wireless system.

Battery life can be an important issue for UEs. A UE may be configured to use a DRX cycle that enables the UE to monitor for downlink control information, e.g., a Physical Downlink Control Channel (PDCCH), discontinuously in order to reduce battery use at the UE. In systems that utilize Carrier Aggregation (CA), the UE can communicate with the network utilizing a primary cell (PCell) and a secondary cell (SCell). PCells and SCells may carry different types of traffic. Data bursts on an SCell may be interleaved with inactivity periods. Such periods of inactivity present an ideal situation for DRX. In addition, active SCells can consume more power that can reduce the battery life of UEs. In some instances, PCells and SCells may be supported by separate transceivers.

Aspects presented herein provide an enhanced power management solution, by configuring a UE with more than one DRX configuration for different cells. As described in detail herein, the network may configure a plurality of DRX groups and provide each of the plurality of DRX groups with a respective DRX configuration.

In an aspect of the disclosure, a method, a computer-readable medium, and an apparatus are provided for wireless communication at a base station. The apparatus determines a configuration of a plurality of DRX groups for communicating with a UE. The apparatus then configures the UE with a first DRX configuration of a first DRX group for a first set of serving cells. The apparatus then configures the UE with a second DRX configuration of a second DRX group for a second set of serving cells.

In another aspect of the disclosure, a method, a computer-readable medium, and an apparatus are provided for wireless communication at a UE. The apparatus receives a first DRX configuration of a first DRX group for a first set of serving cells. The apparatus then receives a second DRX configuration of a second DRX group for a second set of serving cells. Then, the apparatus enters a DRX mode based on at least one of the first DRX configuration for the first set of serving cells and the second DRX configuration for the second set of serving cells.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
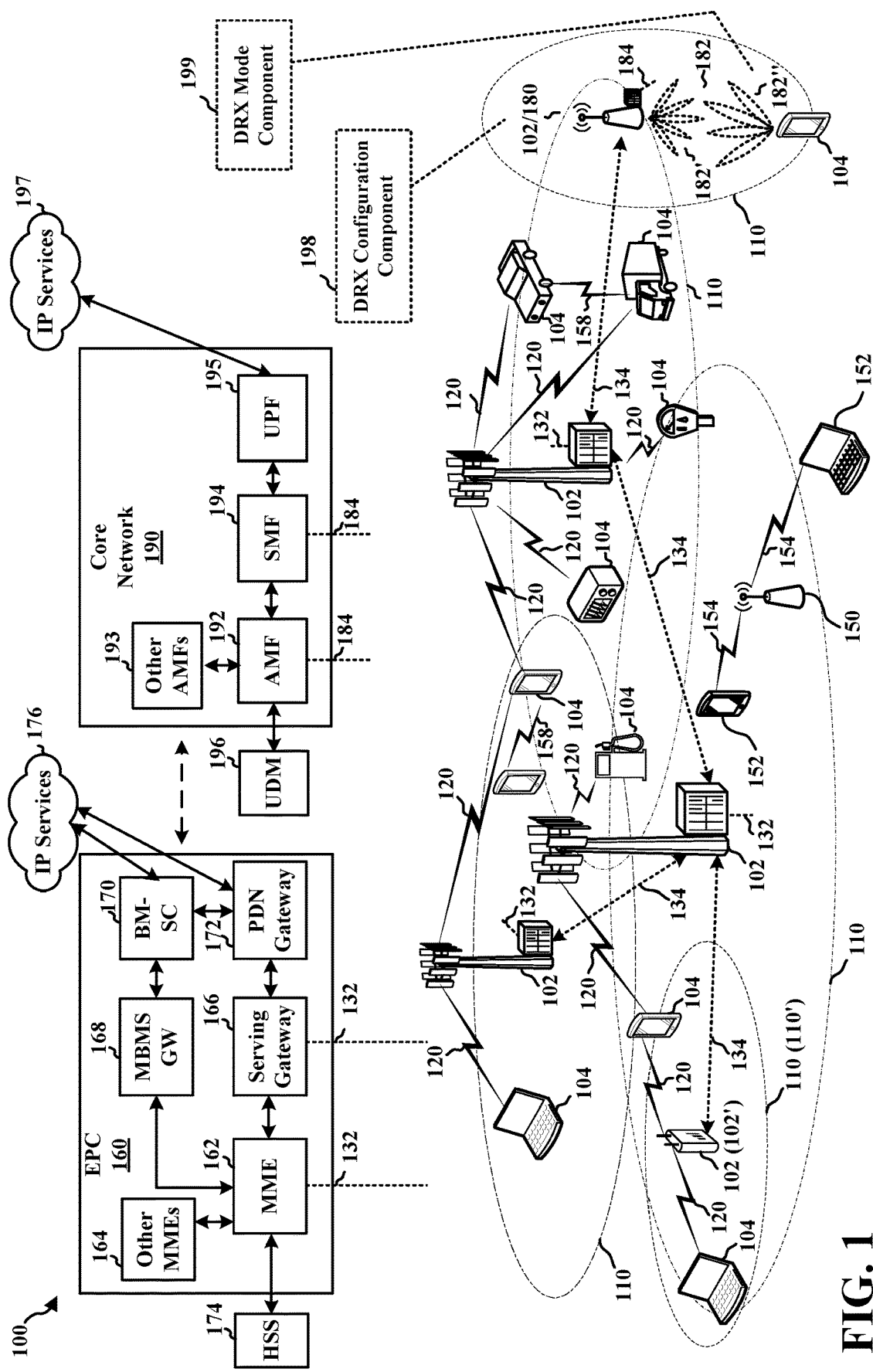
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEd 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a device (e.g., the base station 180) may be configured to comprise a DRX configuration component 198 that may be configured to determine a configuration of a plurality of DRX groups for communicating with a UE. For example, in one configuration, the base station 180 may determine a configuration of a plurality of DRX groups for communicating with a UE. The base station may configure the UE with a first DRX group for a first set of serving cells. The first set of serving cells may communicate with the UE using a first frequency range. The base station may configure the UE with a second DRX group for a second set of serving cells. The second set of serving cells may communicate with the UE using a second frequency range.

Referring again to FIG. 1, in certain aspects, a device (e.g., the UE 104) may be configured to comprise a DRX mode component 199 that may be configured to cause the apparatus to enter DRX mode. For example, in one configuration, the UE 104 may receive a first DRX group for a first set of serving cells. The UE may receive a second DRX group for a second set of serving cells. The UE may enter a DRX mode based on at least one of the first DRX configuration for the first set of serving cells and the second DRX configuration for the second set of serving cells.

Although the following description may be focused on 5G NR, the concepts described herein may be applicable to other similar areas, such as LTE, LTE-A, CDMA, GSM, and other wireless technologies.

Figure 2:
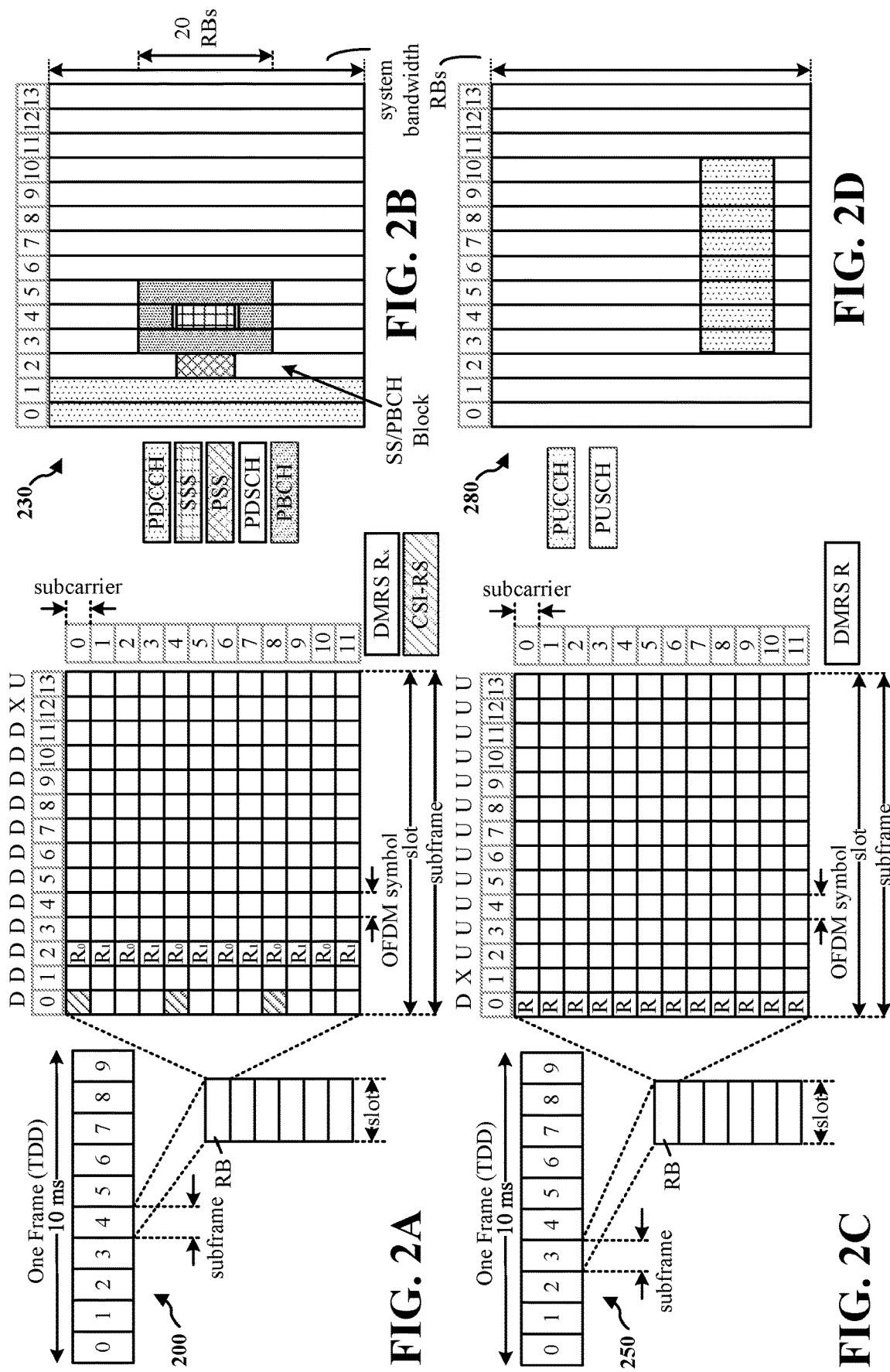
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
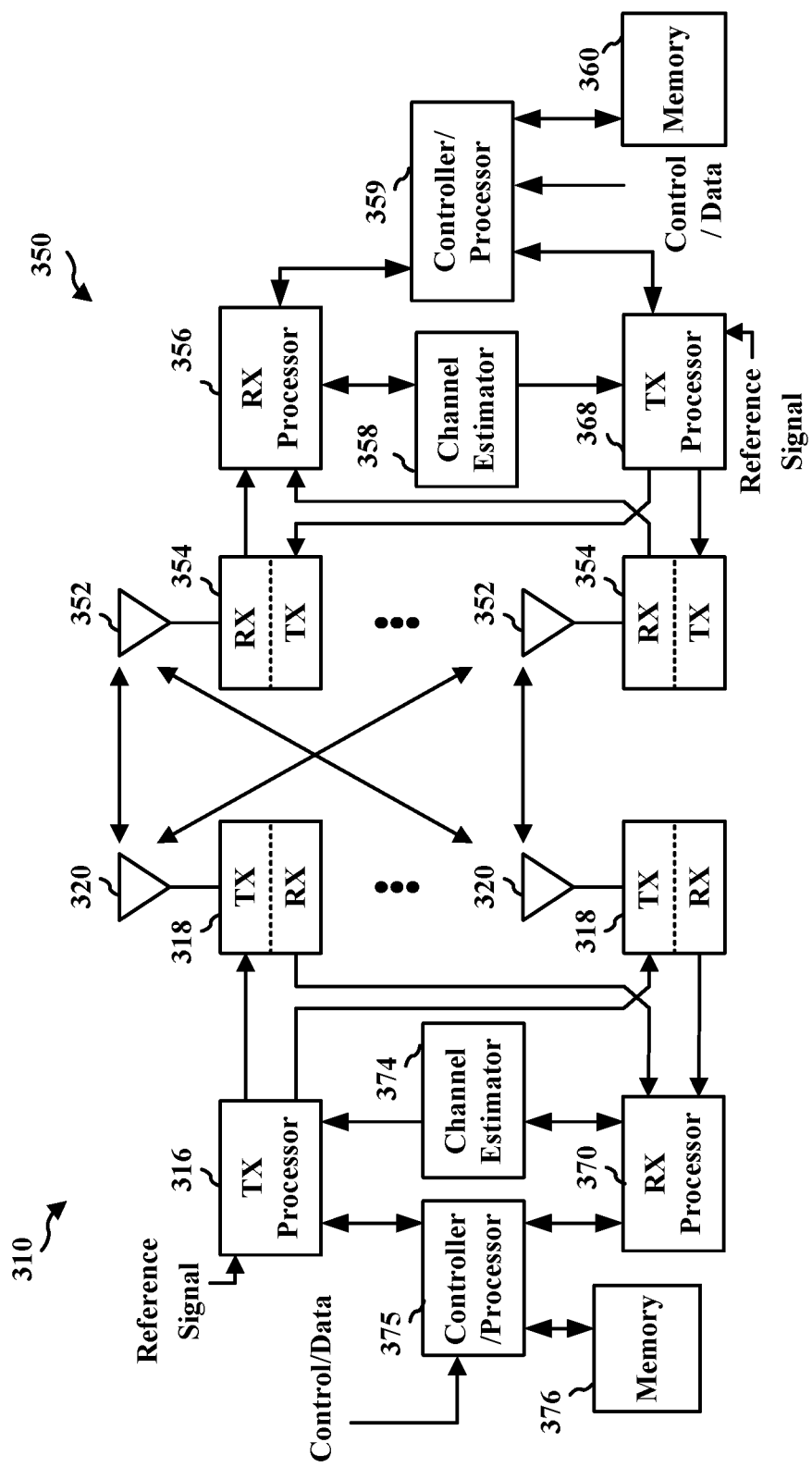
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Figure 4:
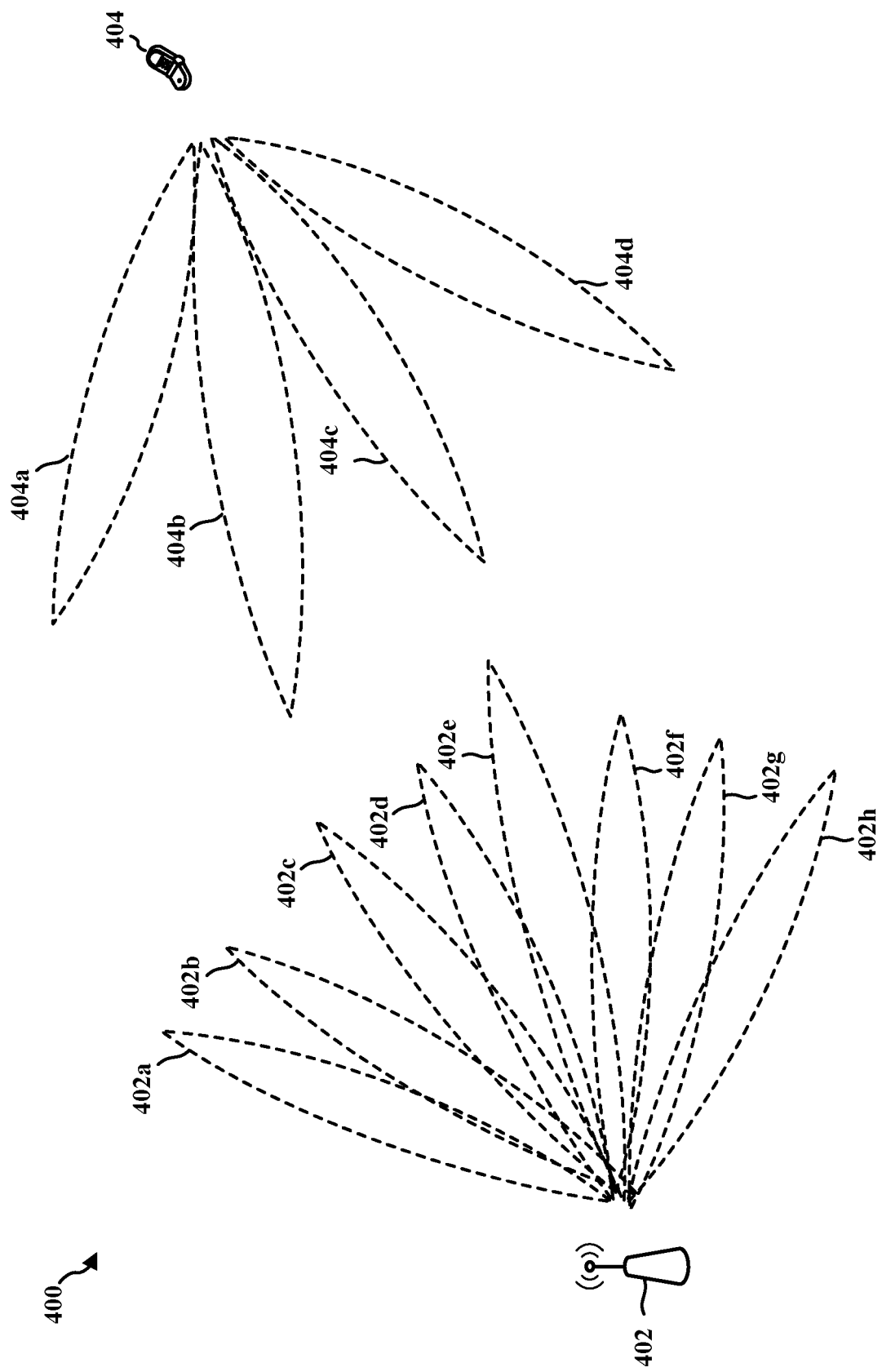
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

A UE may be configured by a base station for DRX. During an RRC connected state, when there is no data transmission in either direction (UL/DL), the UE may go into the DRX mode in which the UE starts monitoring the PDCCH channel discontinuously, using a sleep and wake cycle. Without DRX, the UE needs to monitor PDCCH in every subframe to check whether there is downlink data available for the UE. Continuous monitoring of the PDCCH drains the UE's battery power.

The DRX configuration for a UE may be configured by the network in RRC signaling from a base station, e.g. in an RRC Connection Setup request or an RRC connection reconfiguration request.

A DRX configuration may include the configuration of any of a number of timers and values, e.g., any of an ON duration Timer, a DRX Inactivity Timer, a DRX Retransmission Timer, a DRX UL Retransmission Timer, drx-HARQ-RTT-TimerDL, drx-HARQ-RTT-TimerUL, a long DRX Cycle, a value of the DRX Start Offset, drx-LongCycleStartOffset, a DRX Short Cycle Timer, a short DRX Cycle, drx-SlotOffset, etc. A DRX Cycle may comprise a periodic repetition of ON Duration in which the UE monitors PDCCH and an OFF Duration, which may be referred to as a DRX opportunity. During the OFF duration, the UE does not monitor for PDCCH. The UE may enter a sleep mode or low power mode in which the UE minimizes power consumption by shutting down a radio frequency (RF) function without detecting communication from the base station.

The DRX Inactivity Timer gives a time, e.g., in terms of TTI duration, after the UE successfully decodes PDCCH before the UE may again enter the OFF Duration. The On Duration Timer may give the number of consecutive PDCCH subframe(s) that need to be monitored/decoded when the UE wakes up from the OFF duration in DRX Cycle. The DRX Retransmission Timer may give a consecutive number of PDCCH subframe(s) for the UE to monitor when a retransmission is expected by the UE. A DRX short cycle may correspond to a first DRX cycle that the UE enters after successful expiration of DRX inactivity timer. The UE may be in the short DRX cycle until the expiration of DRX short cycle timer. After that, the UE may enter a Long DRX cycle. A DRX Short Cycle Timer may be a parameter that gives a number of consecutive subframe(s) that the UE shall follow the short DRX cycle after the DRX Inactivity Timer has expired.

Thus, after a successful attempt of DL data, a DRX Inactivity Timer may started for a number of subframes. If there is any UL or DL data transmission during DRX Inactivity Timer the timer restarts again. If DRX Inactivity Timer expires without UL/DL activity, the UE may enter the DRX cycle to achieve power savings. The UE may start with a Short DRX Cycle. If a short cycle timer expires, the UE may enter a longer DRX cycle. The UE may further be able to transition to an idle mode DRX based on an RRC inactivity timer.

Figure 5:
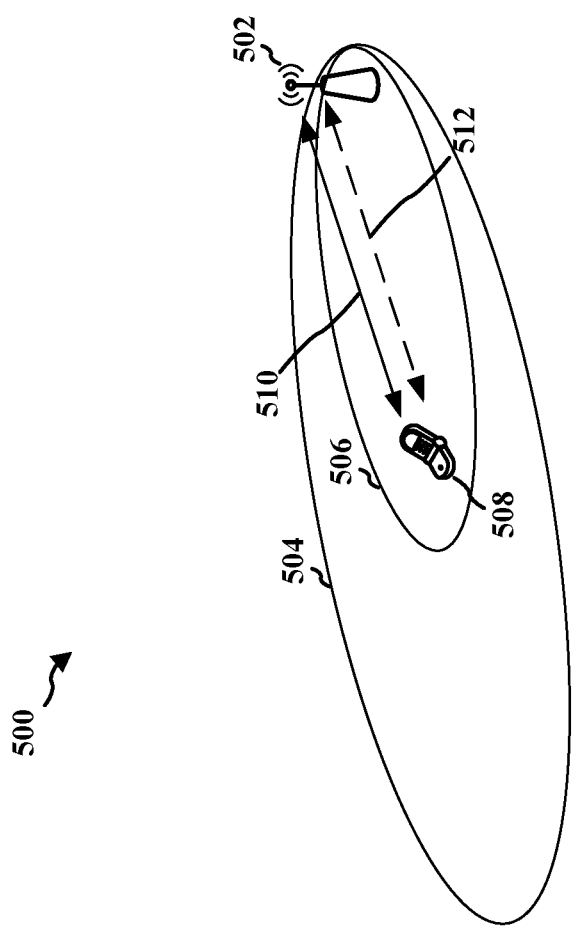
FIG. 5 illustrates a wireless communication system in accordance with certain aspects of the present disclosure.

FIG. 5 illustrates a wireless communication system 500 in accordance with certain aspects of the present disclosure. The wireless communication system 500 may include a base station 502 and a UE 504. The base station may correspond to, e.g., base station 102, 180, 310, 402, 502, 604, 1350, apparatus 1002/1002'. The UE may correspond to, e.g., UE 104, 350, 404, 508, 602, 1050, apparatus 1302/1302'.

In systems that utilize CA, as shown in FIG. 5, the UE 508 may communicate with the network via the base station 502 utilizing a primary cell (PCell) 510 and a secondary cell (SCell) 512. For example, CA allows a UE to transmit and receive data, simultaneously, on multiple component carriers from a single base station. Although the example in FIG. 5 illustrates a single base station, in another example, the PCell may correspond to a first base station and the SCell may correspond to a second base station. PCells and SCells may carry very different types of traffic. A PCell may always be activated and may be configured to have wide coverage 504. For example, PCell 510 may be generally used for scheduling and other control procedures, as well as applications (e.g., voice) that require carriers that provide more on coverage 504 than throughput. SCell 512 may be activated to help offload bursts of traffic from the PCell 510, as well as be used for applications (e.g., video/data streaming) that prefer to use high bandwidth carriers. Voice and data streaming have very different traffic profiles, in terms of duration of data bursts and idle time between data bursts.

In the example of FIG. 5, PCell 510 and SCell 512 may operate on separate frequency bands, e.g., sub 6 GHz carriers and mmW, respectively. As such, the PCell 510 and the SCell 512 may provide different coverage 504, 506. The coverage 504 provided by PCell 510 may be greater than the coverage 506 provided by SCell 512, which may be due, in part, to the different frequency bands.

In CA, the carriers may be aggregated in the same band or across different bands. Carriers aggregated in the same band are known as intra-band, contiguous or intra-band, non-contiguous. In these arrangements, the carriers are within the same band and the aggregated carriers are either adjacent each other (e.g., intra-band, contiguous) or the carriers are not adjacent each other such that there is some frequency spacing separating the carriers (e.g., intra-band, non-contiguous). In inter-band non-contiguous, the carriers belong to different operating frequency bands. For example, a PCell may be on a sub 6 GHz carrier (e.g., FR1) and an SCell may be on high-frequency carriers (e.g., mmW, FR2).

Implementing inter-band non-contiguous CA may require the use of separate hardware components (e.g., transceivers). Each transceiver may need a separate power management configuration. As such, a DRX configuration that is utilized for sub 6 GHz carriers on a PCell may not be suitable or provide optimal power management for mmW carriers on a SCell. As presented herein, improvements in wireless communication may be achieved through enabling a network to configure multiple DRX profiles, e.g., for different carriers or cells.

In some configurations, the network may configure the DRX groups for communicating with at least one UE. In some aspects, the network may configure one or more DRX groups. Each of the DRX groups may be configured to have respective DRX configuration parameters (e.g., cycle length, on duration, etc.). The network may have flexibility in determining the configuration of the DRX groups. Each DRX group may comprise a set of serving cells. Thus, each serving cell may be associated with a DRX group. A PCell may be associated with a first DRX group and an SCell may be associated with a second DRX group. In another example, a first cell using FR1 may be assigned to a first DRX group, and a second cell using FR2 may be assigned to a second DRX group. In some instances, the set of serving cells may comprise one or more serving cells. The set of serving cells may be configured based on different parameters. In one example, the set of serving cells may share a traffic profiles. In another example, the set of serving cells may be grouped based on frequency bands. The network may determine the number of DRX groups to configure and may also determine the number of sets of serving cells. The network may assign an active serving cell to one of the DRX groups. The network may be configured to assign or re-assign serving cells to a particular DRX group via RRC or MAC Control Element (MAC-CE) transmitted to the UE.

The network may be further configured to activate or "wake up" a DRX group that is in an off-state. The network may send a signal in a serving cell on an active DRX group to activate an inactive DRX group that is in the off-state. In some aspects, the network may send a signal to activate an inactive DRX group when none of the DRX groups are active or in an on-state. The ability to activate or "wake up" an inactive or off-state DRX group may be advantageous, especially in aspects where the DRX groups have different DRX sleep cycles. For example, in aspects where a first DRX group has FR1 carriers and a second DRX group has FR2 carriers, the high-frequency carriers may be configured with long DRX sleep cycles. The network may send a signal through a serving cell in the first DRX group having the FR1 carriers, such that the network may activate the second DRX group having the FR2 carriers prior to its next on duration. As such, the network may wake up the second DRX group in order to transmit data without waiting until the next on duration of the second DRX group.

Figure 6:
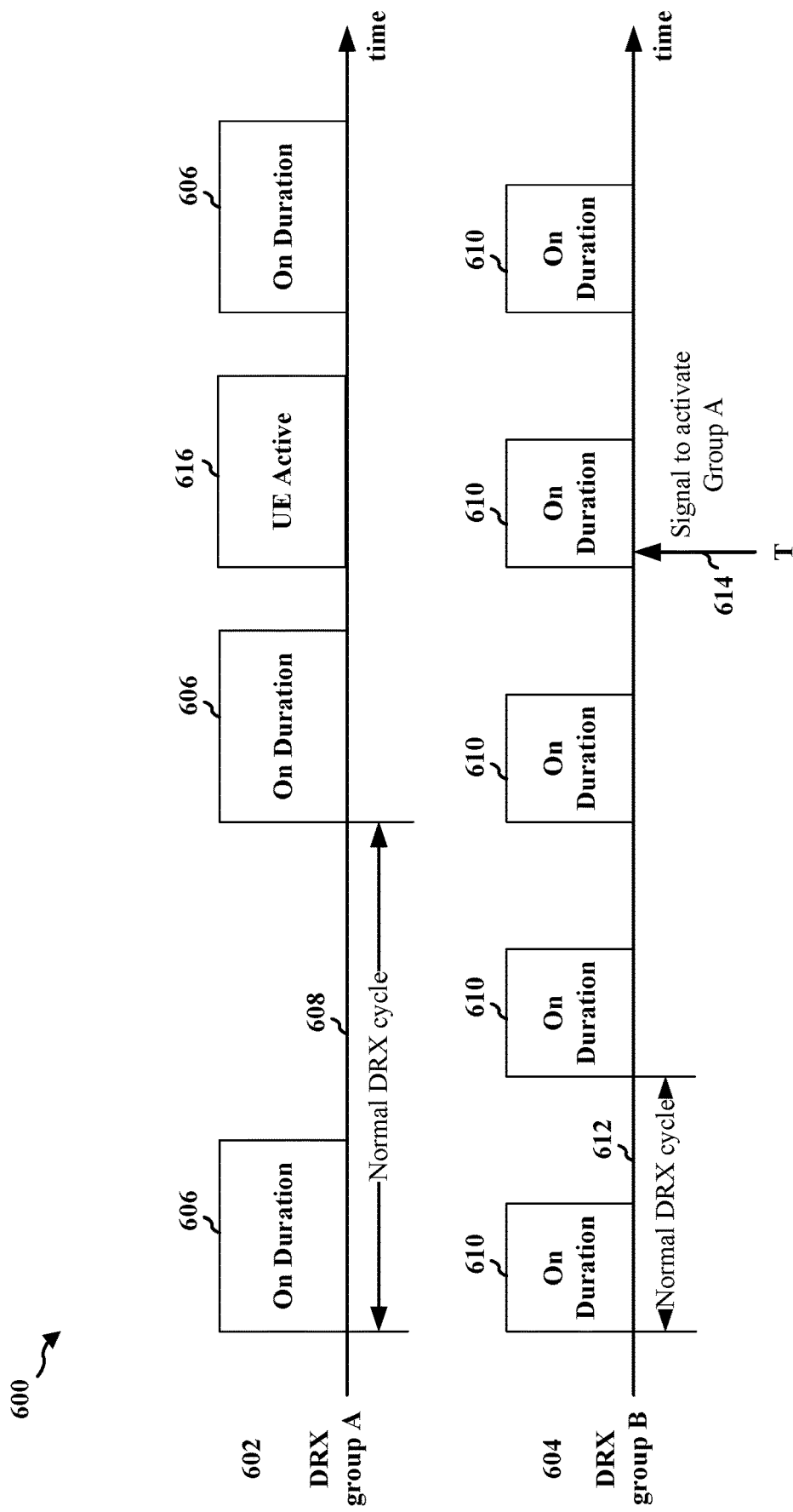
FIG. 6 illustrates an example of a DRX configuration in accordance with certain aspects of the present disclosure.

FIG. 6 illustrates an example 600 in which a UE is configured for DRX with two DRX groups, DRX group A 602 and DRX group B 604. DRX group A 602 comprises an On Duration 606 and an Off Duration 608. The combination of the On Duration 606 and the Off Duration 608 form a first DRX cycle for DRX group A 602. DRX group B 604 comprises an On Duration 610 and an Off Duration 612. The combination of the On Duration 610 and the Off Duration 612 form a second DRX cycle for DRX group B. The network may configure the DRX cycles of the DRX groups. In some aspects, a DRX cycle 608 of the first DRX configuration may be an integer multiple of a DRX cycle 612 of the second DRX configuration. For example, the DRX cycle of DRX group A 602 is illustrated as being equivalent to two DRX cycles of DRX group B 604. For On Durations 606, 610 the respective DRX groups 602, 604 are in an power on-state. During the on duration, the UE may monitor for PDCCH to determine if the UE is scheduled to receive data from the network. During the Off Durations 608, 610 the respective DRX groups 602, 604 are in a power off-state. During the Off Durations, the UE may enter a reduced power mode in which the UE does not monitor for PDCCH. In some aspects, a first on-state of a first DRX configuration may be aligned with a second on-state of a second DRX configuration. For example, in FIG. 6, some of the On Durations 606, 610 may have aligned start positions, such that the On Durations 606, 610 that are aligned partially overlap. The aligned start positions of the On Durations 606, 610 may provide a power saving feature. In some aspects, the start positions of On Durations 606, 610 may not be aligned and/or may or may not partially overlap.

The network may be configured to transmit a signal in one of a first set of serving cells to the UE. The signal provides an indication for the UE to change a power off-state of serving cells in a particular DRX group to a power on-state. The signal may comprise an index of the DRX group to be activated. The signal may be transmitted to the UE via DCI. For example, the signal may comprise cross-carrier scheduling DCI or an aperiodic CSI request. In another example, the signal may comprise a MAC-CE. For example, in FIG. 6, at a time T, a carrier in DRX group B is active because time T coincides with an On Duration 610 of DRX group B, while at time T, DRX group A is in an Off Duration 608 based on the DRX cycle for DRX group A. The network may be configured to activate the DRX group A, in the event that an application (e.g., video or data stream) is initiated, and without having to wait for the next On Duration of the DRX group A. In some aspects, the network may send the signal 614 at time T to the UE on a carrier within DRX group B. At time T, the carriers within DRX group B are active and the network may take advantage of the active carriers in DRX group B to communicate with the UE for DRX Group A. The network send the signal 614 to the UE through an active carrier in DRX group B in order to activate the DRX group A at the time T. As such, the UE will enter a power on-state 616 at time T, such that the DRX group A transitions to an active state earlier than the next scheduled On Duration. In some aspects, the signal sent by the network to activate the DRX group A may be a cross carrier DCI. In some aspects, the signal sent by the network to activate the DRX group A may be a MAC-CE.

Figure 7:
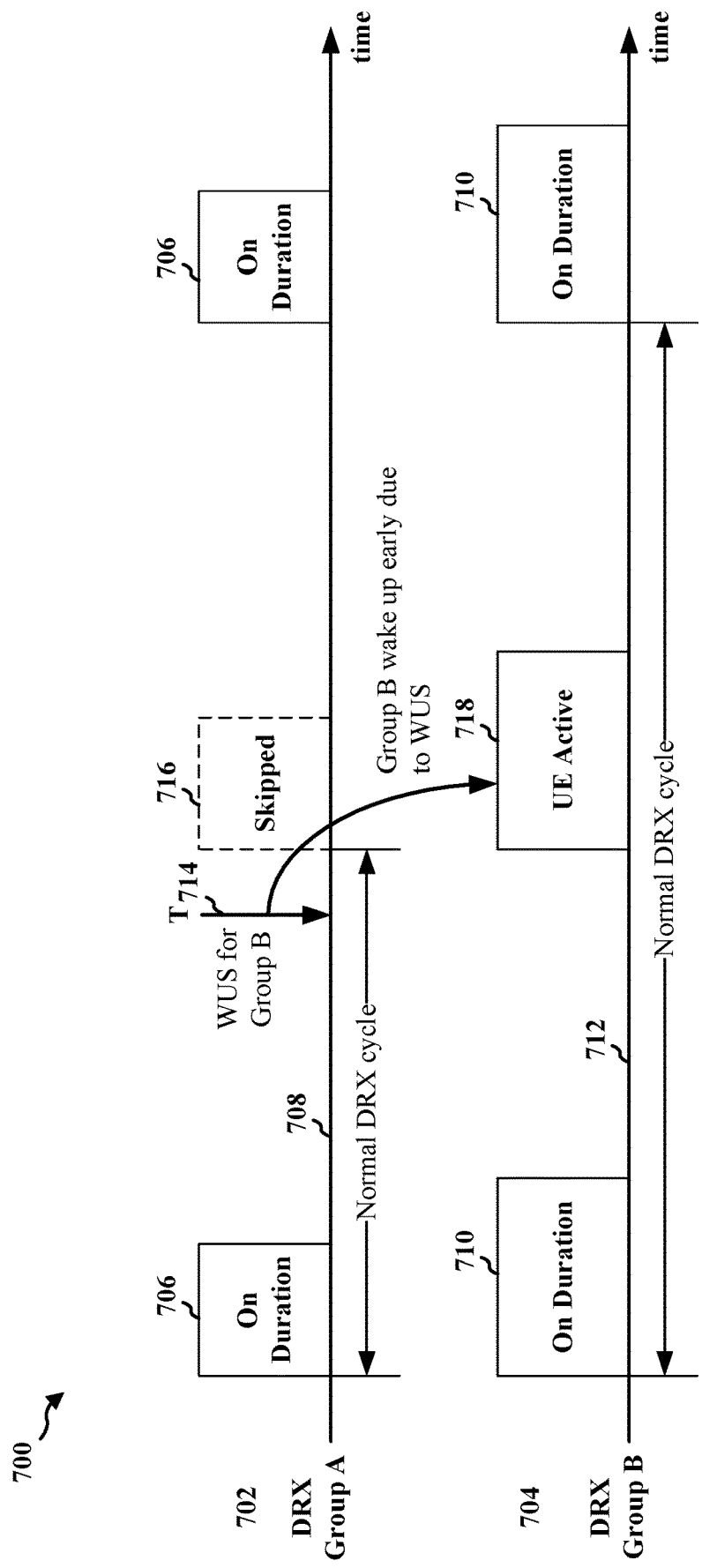
FIG. 7 illustrates another example of a DRX configuration in accordance with certain aspects of the present disclosure.

FIG. 7 illustrates another example 700 in which a UE is configured for DRX with different DRX configurations for two DRX groups, DRX group A 702 and DRX group B 704. DRX group A 702 comprises an On Duration 706 and an Off Duration 708. The combination of the On Duration 706 and the Off Duration 708 form a first DRX cycle for DRX group A 702. DRX group B 704 comprises an On Duration 710 and an Off Duration 712. The combination of the On Duration 710 and the Off Duration 712 form a second DRX cycle for DRX group B 704. The DRX group A 702 and DRX group B 704 may be similar to DRX group A 602 and DRX group B 604, respectively, such that the network may configure DRX groups A and B 702, 704 in a manner similar to DRX groups A and B 602, 604. However, in the example 700 of FIG. 7, the network may be configured to transmit a WUS to the UE such that the WUS provides an indication for the serving cells in a desired DRX group to enter a power active state. The network may transmit the WUS before a DRX On Duration of any of the plurality of DRX groups. For example, the network may send the WUS 714 to the UE at time T. At time T, DRX group A is in the Off Duration 708, and DRX group B is in the Off Duration 712. Since the DRX groups 702, 704 are not active at time T, the network cannot take advantage of an active carrier to activate the desired DRX group using cross carrier DCI or MAC-CE, as discussed above in the example 600 of FIG. 6. As such, the network may be configured to activate a desired DRX group prior to any of the On Durations of the plurality of DRX groups. In some aspects, a WUS may comprise a sequence sent by the network before a DRX On Duration to indicate that the UE should stay on to receive new data. The WUS may comprise non-sequence based signaling and the disclosure is not intended to be limited to the aspects disclosed herein. When the UE does not receive the WUS, the UE may return to the sleep state without waking up. In some aspects, each of the plurality of DRX groups may be associated with a unique WUS. In such aspect, when the UE receives the unique WUS, the UE may determine which DRX group the UE is supposed to wake up. In some aspects, a single WUS may be configured for the UE. Thus, the WUS may correspond to multiple DRX groups for which the UE is configured. In this example, the WUS may comprise a bitmap that indicates the DRX group to be activated. Upon receipt of the WUS by the UE, the UE changes serving cells into the DRX group associated with the received WUS to enter a power on-state. Each of the plurality of DRX groups may be configured to operate in accordance with their respective DRX configurations until an associated WUS is received.

In the example 700 of FIG. 7, the WUS 714 is sent to the UE, at time T, on DRX group A and provides an indication that the UE is supposed to wake up for DRX group B. As a result of the received WUS 714, the UE wakes up for DRX group B prior to the next On Duration 710, e.g., at a time that coincides with the next scheduled On Duration 716 of DRX group A. Thus, DRX group B experiences an earlier On Duration 718 due to the WUS. In an example, the next scheduled On Duration 716 of DRX group A may be skipped.

Figure 8:
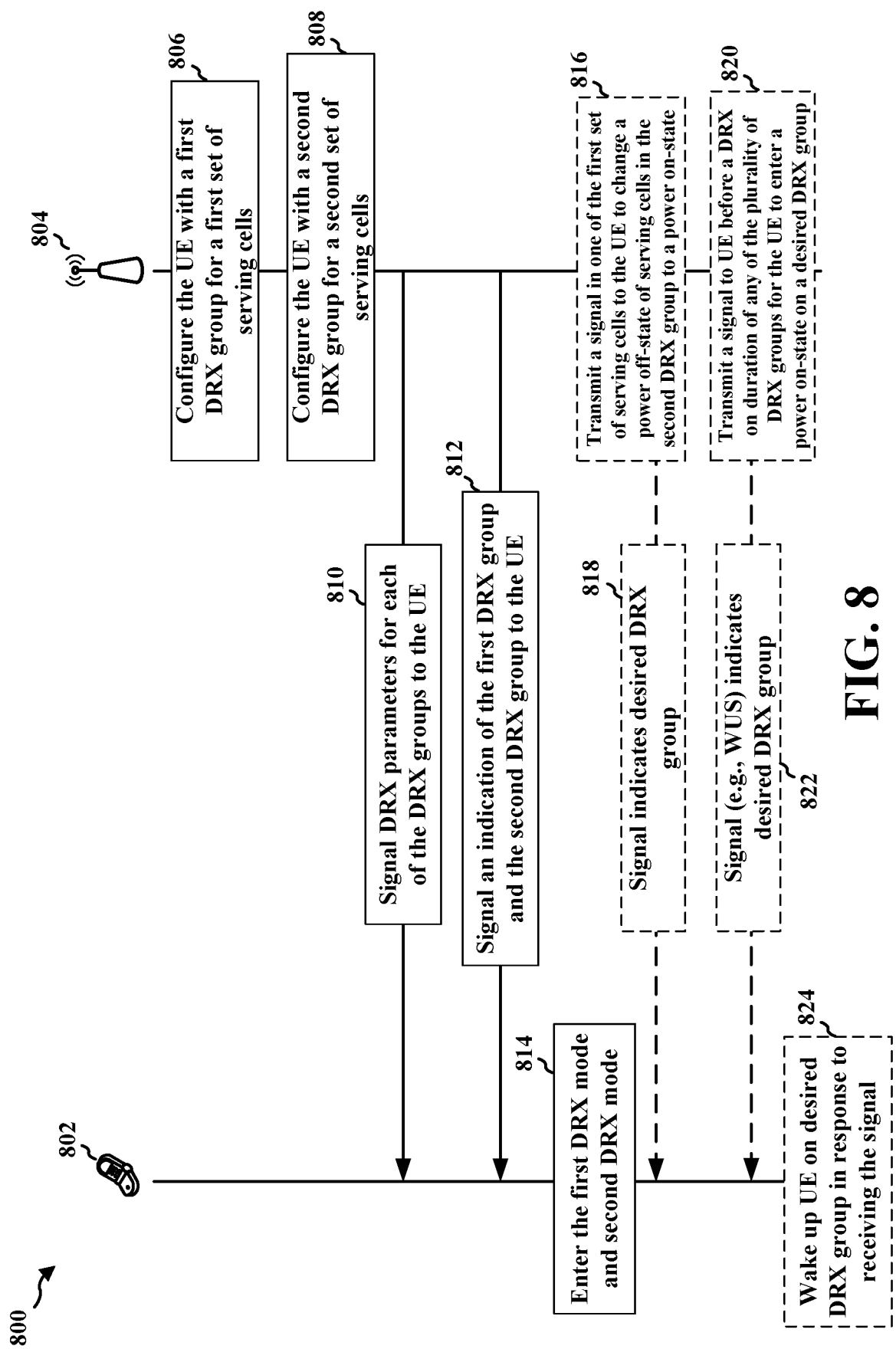
FIG. 8 illustrates an example communication flow between a base station and a UE.

FIG. 8 illustrates an example of communication 800 between a base station 804 and a UE 802. The base station may determine different DRX configurations for a plurality of DRX groups. The UE 802 may be configured with a plurality of DRX groups in order to provide improve power management when the UE communicates across different serving cells. In FIG. 8, base station 804 may be configured to support CA such that the base station 804 may communicate to the UE 802 via a PCell and an SCell, in accordance with the system 500 of FIG. 5. Base station 804 may correspond to, e.g., base station 102, 180, 310, 402, 502, 1350, apparatus 1002/1002'. The UE 802 may correspond to, e.g., UE 104, 350, 404, 508, 1050, apparatus 1302/1302'. The communication between the base station 804 and UE 802 may comprise mmW communication and/or sub 6 GHz communication.

At 806, the base station 804 may configure the UE 802 with a first DRX configuration of a first DRX group for a first set of serving cells. At 808, the base station 804 may configure the UE 802 with a second DRX configuration of a second DRX group for a second set of serving cells. The first set of serving cells may comprise a PCell for the UE and the second set of serving cells may comprise a SCell for the UE. Thus, the UE may be configured with the first DRX configuration for the PCell and the second DRX configuration for the SCell. The first set of serving cells, e.g., the PCell, may communicate with the UE using a first frequency range. The second set of serving cells, e.g., the SCell, may communicate with the UE using a second frequency range. In some aspects, the first frequency range may be a sub-6 GHz frequency range. In some aspects, the second frequency range may be a mmW frequency range. The amount of the plurality of DRX groups may be determined by the network. For example, the base station may group serving cells into DRX groups based on a frequency range of the serving cells and/or types of traffic carried by serving cells. The first DRX configuration and/or the second DRX configuration may be sent to the UE using RRC. The UE may be configured with the first DRX configuration and/or the second DRX configuration using MAC-CE.

For example, the base station 804 may signal 810 the DRX parameters for each of the DRX groups to the UE. The DRX parameters may be signaled in RRC signaling. The RRC signaling may comprise an information element (IE) which includes a list of DRX groups and respective DRX parameters. The UE may then be configured with the first DRX configuration from among the parameters signaled at 810 by indicating an index of the first DRX group from the plurality of DRX groups. The index may be comprised in an IE in a serving cell configuration for a first serving cell. The index may be comprised in a MAC-CE sent via PDCCH of the first serving cell. The index may be comprised in a MAC-CE comprising paired parameters. The paired parameters may provide an indication to the UE of a new cell index and a new DRX group of the active serving cell. Similarly, the UE may be configured with the second DRX configuration from among the parameters signaled at 810 by indicating an index of the second DRX group in a serving cell configuration for the second serving cell.

Thus, the base station 804 may signal 812 an indication of the first DRX group and the second DRX group to the UE, e.g., in the configuration for the respective serving cell. Although 812 is illustrated as a single signal, the base station may separately indicate the first DRX configuration and the second DRX configuration to the UE. Upon receipt of the signal(s) 812, the UE 802 may use the configurations to enter the first DRX mode and/or the second DRX mode. The UE 802 continues to operate in accordance with the first and/or second DRX mode until the UE receives instructions otherwise.

At 816, the base station 804 may transmit a signal, e.g., via the first serving cell, to the UE to change a power off-state of serving cells in the second DRX group to a power on-state, e.g., as described in connection with FIGS. 6 and 7. The signal may comprise an index of the second DRX group to be activated. The signal may comprise at least one of a cross carrier DCI or MAC-CE. In some aspects, a first on-state of the first DRX configuration may be aligned with a second on-state of the second DRX configuration. In some aspects, a DRX cycle of the first DRX configuration may be an integer multiple of a DRX cycle of the second DRX configuration. The base station 804 then transmits 818 the signal that may be configured to provide instructions to the UE 802 to activate on a desired DRX group.

In the alternative, at 820, the base station 804 may transmit a signal (e.g., WUS) to the UE before a DRX on duration of any of the plurality of DRX groups for the serving cells in a desired DRX group to enter a power active state. The signal (e.g., WUS) may provide an indication for the serving cells in the desired DRX group to enter the power active state. In some aspects, each of the plurality of DRX groups may be associated with a unique WUS. In some aspects, a single WUS sequence may be configured for the UE. The WUS may comprise a bitmap, or other indication, indicating the DRX group to be activated. The UE may change to a power on state for a serving cell in the DRX group associated with the received WUS. The UE may operate in accordance with the respective DRX configuration for each of the plurality of DRX groups until an associated WUS is received. The base station 804 transmits 822 the signal (e.g., WUS) that may be configured to provide instructions to the UE 802 to activate on a desired DRX group.

The UE 802, upon receipt of the transmission 818 or 822, wakes up 824 for the serving cell corresponding to the desired DRX group in response to the receiving the signal 818, 822. In some aspects, the signal 818 may be configured to activate the UE in accordance with the diagram 600 of FIG. 6. In some aspects, the signal 822 may be configured to wake up the UE in accordance with the diagram 700 of FIG. 7.

Figure 9:
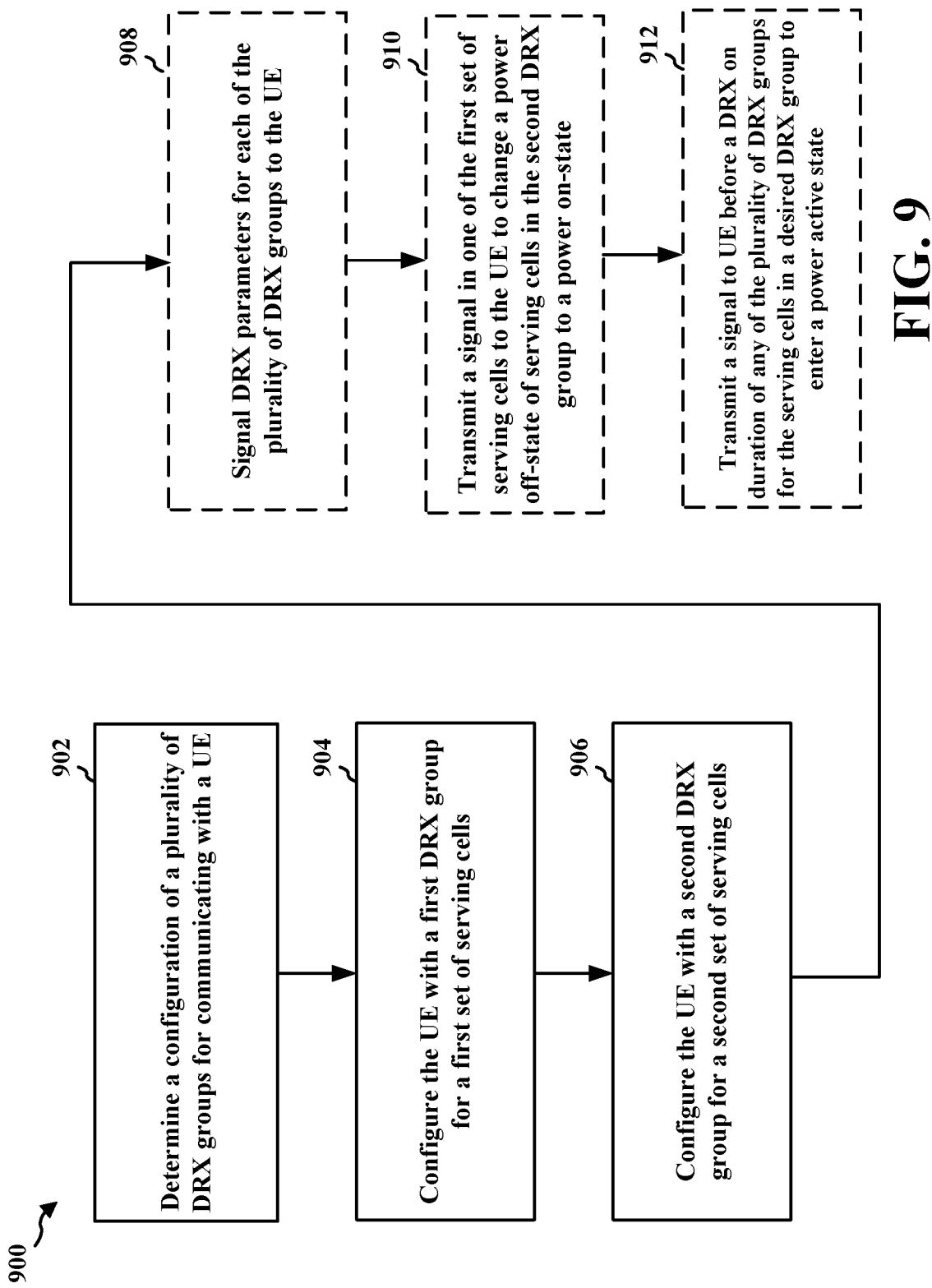
FIG. 9 is a flowchart of a method of wireless communication.

FIG. 9 is a flowchart 900 of a method of wireless communication. The method may be performed by a base station (e.g., the base station 102, 180, 310, 402, 502, 604, 1350; the apparatus 1002/1002'; the processing system 1114, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The base station may implement the method of diagram 800. Optional aspects are illustrated with a dashed line. The method may determine a plurality of DRX groups in order to provide an improved power management when the UE communicates across different serving cells.

At 902, the base station may determine a configuration of a plurality of DRX groups for communicating with a UE. For example, 902 may be performed by DRX configuration component 1006 of apparatus 1002. The UE may be configured with a plurality of DRX groups that may be configured to provide optimized power management across the plurality of DRX groups. The amount of the plurality of DRX groups may be based on at least one of a frequency range of serving cells or types of traffic carried by serving cells. The base station may be configured to support CA such that the base station 902 may communicate to the UE via a PCell and an SCell, in accordance with the system 500 of FIG. 5.

At 904, the base station configures the UE with a first DRX configuration of a first DRX group for a first set of serving cells. For example, 904 may be performed by first DRX component 1008 of apparatus 1002. FIG. 8 illustrates an example 806 of the base station configuring the UE with a first DRX configuration of a first DRX group for a first set of serving cells. The first set of serving cells may comprise a PCell. PCells may always be activated and may provide wider coverage. Thus, PCells may generally be used for scheduling and other control procedures, as well as applications that require more on coverage than throughput. The first set of serving cells may communicate with the UE using a first frequency range. In some aspects, the first frequency range comprises a sub-6 GHz frequency range. The base station may configures the UE with the first DRX configuration using RRC signaling or by using a MAC-CE.

At 906, the base station configures the UE with a second DRX configuration of a second DRX group for a second set of serving cells. For example, 906 may be performed by second DRX component 1010 of apparatus 1002. FIG. 8 illustrates an example 808 of the base station configuring the UE with a second DRX configuration of a second DRX group for a second set of serving cells. The second set of serving cells may comprise an SCell. SCell may be activated to help offload data bursts of traffic from the PCell, in some examples. Active SCells may consume more power and may have a more pressing need to reduce power consumption. The second set of serving cells may communicate with the UE using a second frequency range. In some aspects, the second frequency range comprises a mmW frequency range. The base station configures the UE with the second DRX configuration using RRC signaling or by using MAC-CE.

In some aspects, for example, at 908, the base station signals DRX parameters for each of the plurality of DRX groups to the UE. For example, 908 may be performed by DRX parameter component 1016 of apparatus 1002. Although illustrated following 904 and 906, the signaling at 908 may occur prior to the configurations of 904, 906. FIG. 8 illustrates an example 810 of the base station signaling DRX parameters for each of the plurality of DRX groups to the UE. The DRX parameters may be signaled to the UE, by the base station, in RRC signaling. The RRC signaling comprises an IE including a list of DRX groups and respective DRX parameters. The base station may configure the UE with the first DRX configuration, at 904, by indicating an index of the first DRX group from among the plurality of DRX groups. Similarly, the base station may configure the UE with the second DRX configuration, at 906, by indicating an index of the second DRX group from among the plurality of DRX groups. In some aspects, the index may be comprised in an IE in a serving cell configuration for the first set of serving cells. In some aspects, the index may be comprised in a MAC-CE sent in a PDCCH of the first set of serving cells. In yet some aspects, the index may be comprised in a MAC-CE comprising paired parameters. The paired parameters provide an indication of a new cell index and a new DRX group of the active serving cell to the UE.

In some aspects, for example, at 910, the base station may transmit a signal in one of the first set of serving cells to the UE. For example, 910 may be performed by transmission component 1014 of apparatus 1002. FIG. 8 illustrates an example 816 of the base station transmitting a signal in one of the first set of serving cells to the UE. The signal provides an indication for the UE to change a power off-state of serving cells in the second DRX group to a power on-state. Thus, the UE may transition to an on state for the second serving cell in the second set of serving cells, prior to a normal on duration for the second DRX configuration. The signal may comprise an index of the second DRX group to be activated. The signal may comprise at least one of a cross carrier DCI or MAC-CE. In some aspects, a first on-state (e.g., On Duration) of the first DRX configuration may be aligned with a second on-state (e.g., On Duration) of the second DRX configuration. In some aspects, a DRX cycle of the first DRX configuration may be an integer multiple of a DRX cycle of the second DRX configuration. Step 910 may or may not occur.

In some aspects, for example, at 912, the base station transmits a signal (e.g., WUS) to the UE. For example, 912 may be performed by transmission component 1012 of apparatus 1002. FIG. 8 illustrates an example 820 of the base station transmitting a WUS to the UE. The base station sends the WUS before a DRX on duration of any of the plurality of DRX groups. The WUS provides an indication for the serving cells in a desired DRX group to enter a power active state. In some aspects, each of the plurality of DRX groups may be associated with a unique WUS. In some aspects, a single WUS may be configured for the UE, such that the WUS comprises a bitmap indicating which DRX group is to be activated. The UE changes serving cells into the DRX group associated with the received WUS to enter a power on-state. Each of the plurality of DRX groups operate in accordance with their respective DRX configurations until an associated WUS is received indicating otherwise. Step 912 may or may not occur.

Figure 10:
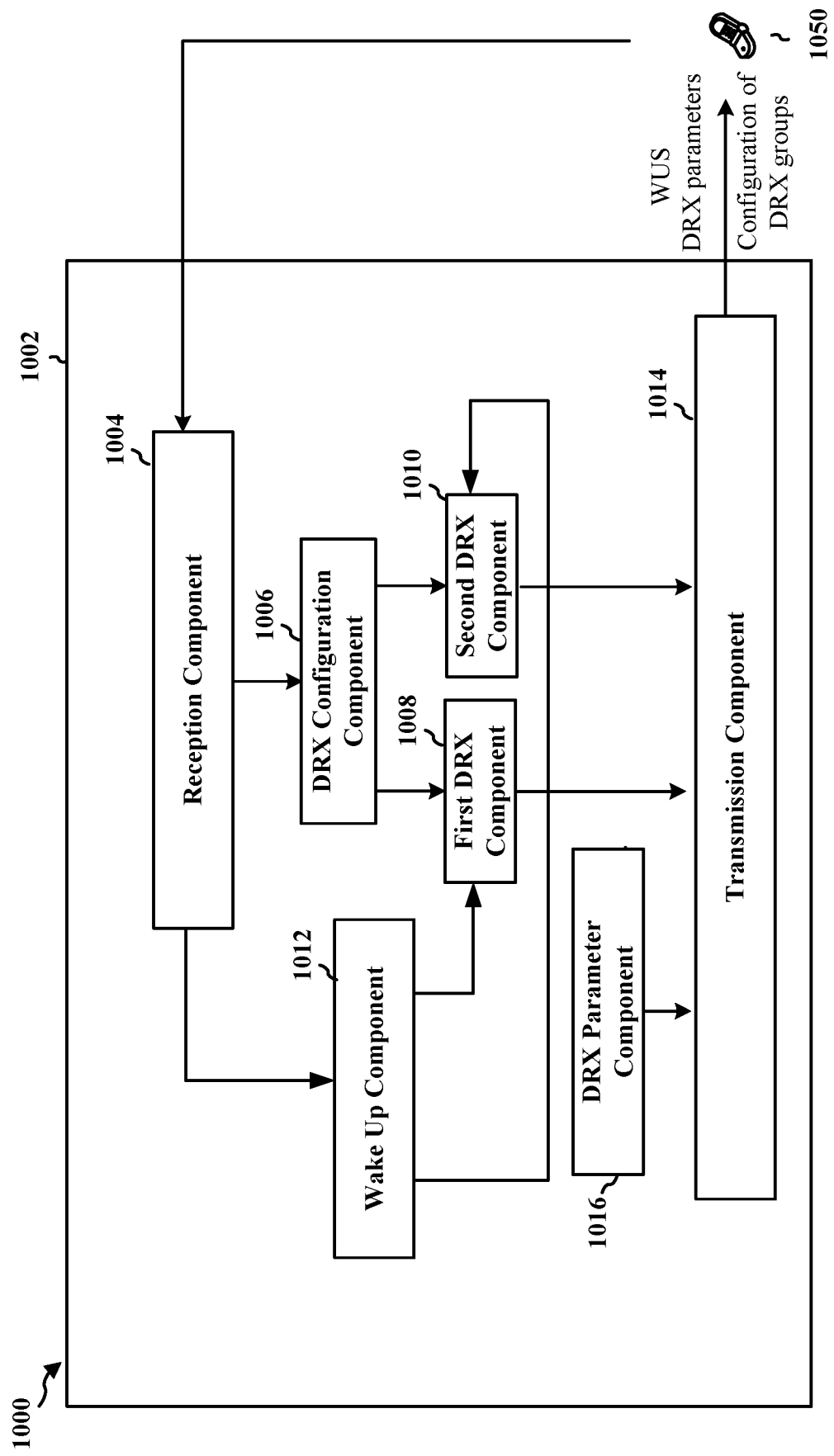
FIG. 10 is a conceptual data flow diagram illustrating the data flow between different means/components in an exemplary apparatus.

FIG. 10 is a conceptual data flow diagram 1000 illustrating the data flow between different means/components in an example apparatus 1002. The apparatus may be a base station or a component of a base station (e.g., base station 102, 180, 310, 402, 502, 604, 1350, apparatus 1002/1002') in wireless communication with a UE 1350 (e.g., UE 104, 350, 404, 508, 802, 1050, apparatus 1302/1302').

The apparatus includes a reception component 1004 that receives uplink communication from UE 1350. The apparatus includes DRX configuration component 1006 that determines a configuration of a plurality of DRX groups for communicating with the UE, e.g., as described in connection with 902 of FIG. 9. The apparatus includes a first DRX component 1008 that configures the UE with a first DRX group for a first set of serving cells, e.g., as described in connection with 904. The apparatus includes a second DRX component 1010 that configures the UE with a second DRX configuration of a second DRX group for a second set of serving cells, e.g., as described in connection with 906 of FIG. 9. The apparatus may include a DRX parameter component 1016 that signals DRX parameters for each of the plurality of DRX groups to the UE, e.g., as described in connection with 908 of FIG. 9. The apparatus may include a transmission component 1014 that transmits a signal in one of the first set of serving cells to the UE to provide an indication for the UE to change a power off-state of serving cells in the second DRX group to a power on-state, e.g., as described in connection with 910 of FIG. 9. The apparatus may include a wake up component 1012 that provides an indication for the serving cells in a desired DRX group to enter a power active state, e.g., as described in connection with 912 of FIG. 9.

The apparatus may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
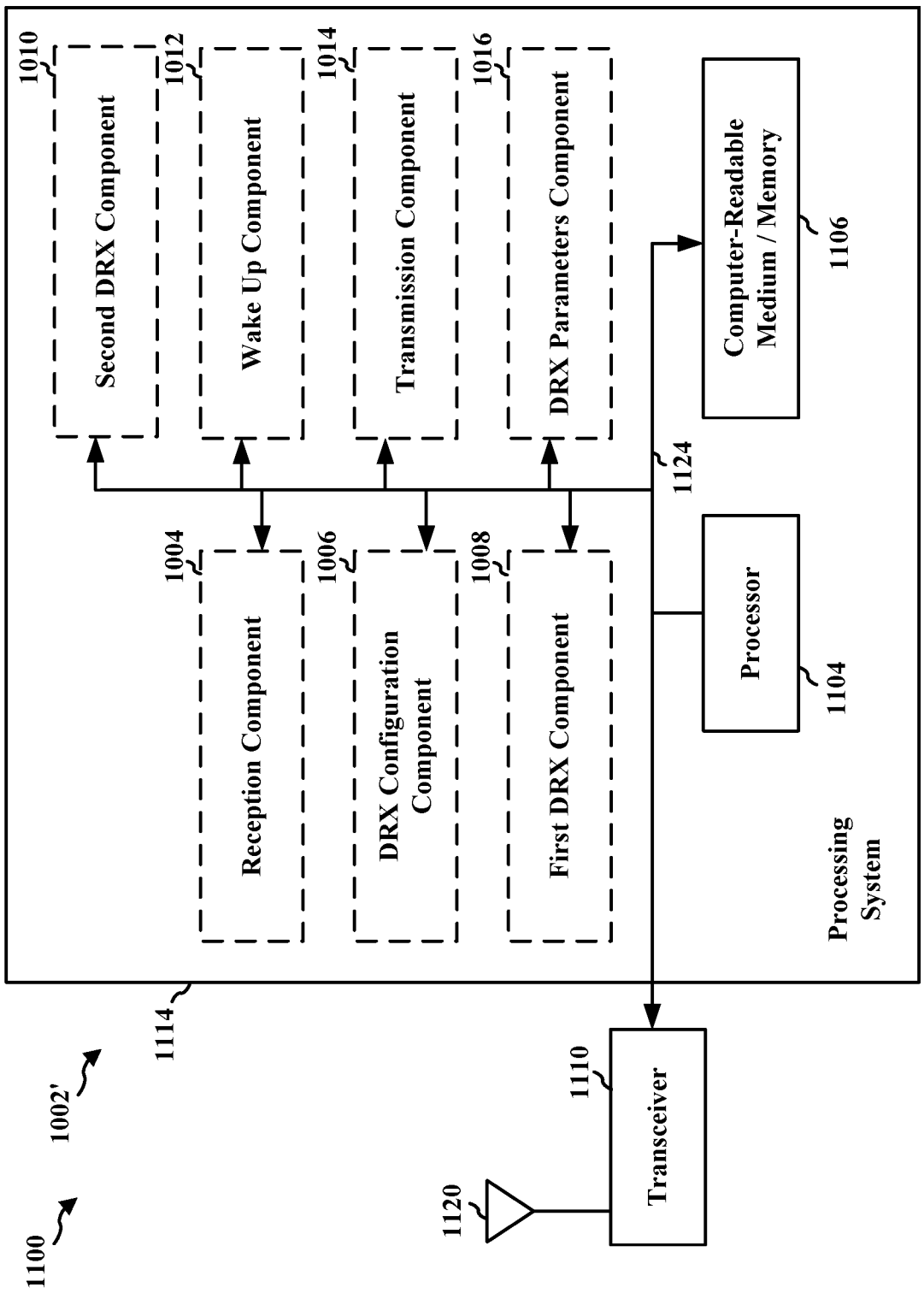
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1014, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016. The components may be software components running in the processor 1104, resident/stored in the computer readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375. Alternatively, the processing system 1114 may be the entire base station (e.g., see 310 of FIG. 3).

In one configuration, the apparatus 1002/1002' for wireless communication includes means for determining a configuration of a plurality of discontinuous reception (DRX) groups for communicating with a user equipment (UE). The apparatus includes means for configuring the UE with a first DRX group for a first set of serving cells. The first set of serving cells communicate with the UE using a first frequency range. The apparatus includes means for configuring the UE with a second DRX group for a second set of serving cells. The second set of serving cells communicate with the UE using a second frequency range. The apparatus may further include means for signaling DRX parameters for each of the plurality of DRX groups to the UE. The apparatus may further include means for transmitting a signal in one of the first set of serving cells to the UE. The signal provides an indication for the UE to change a power off-state of serving cells in the second DRX group to a power on-state. The apparatus may further include means for transmitting a wakeup signal (WUS) to the UE. The WUS is sent before a DRX on duration of any of the plurality of DRX groups such that the WUS provides an indication for the serving cells in a desired DRX group to enter a power active state. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 12:
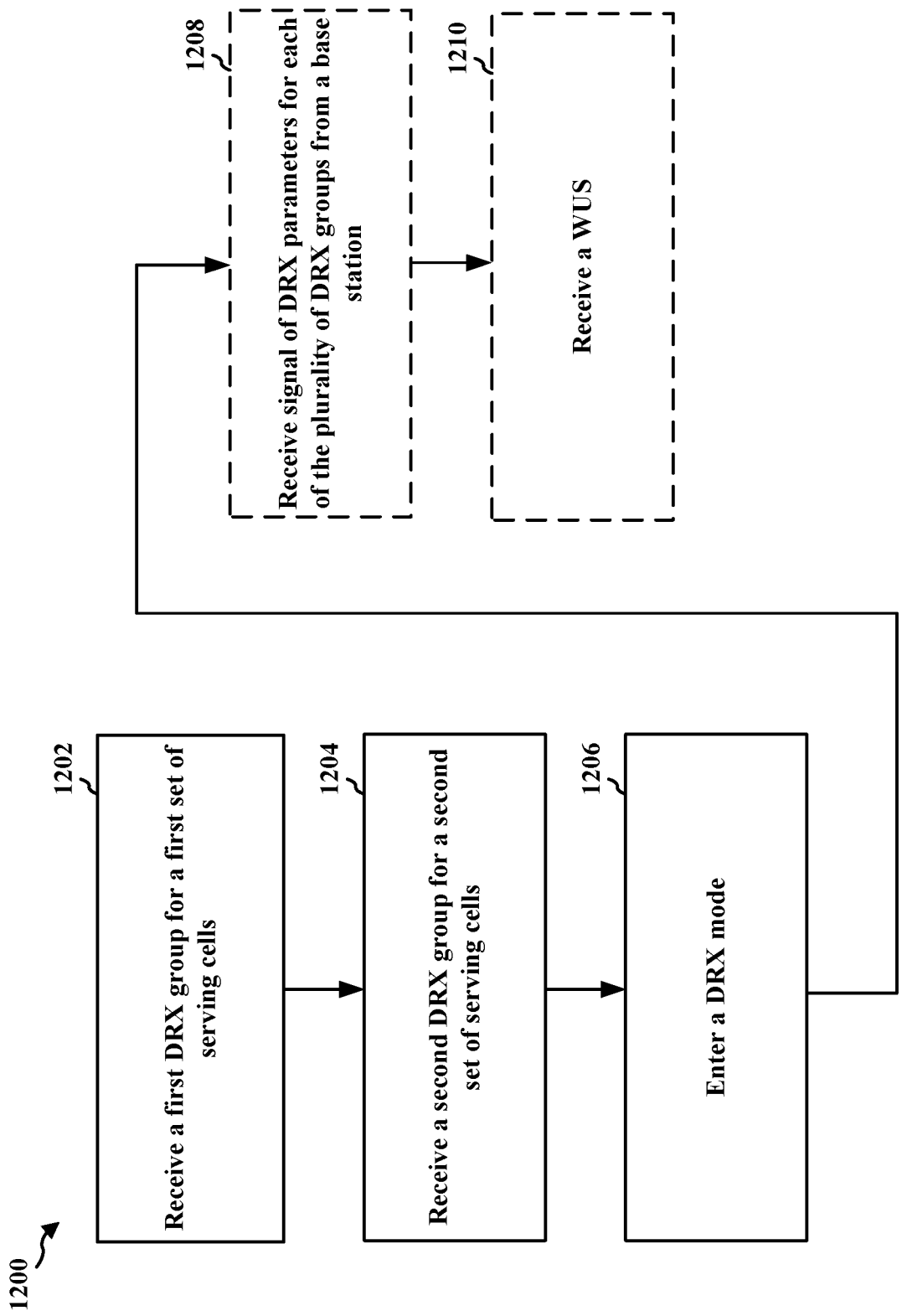
FIG. 12 is a flowchart of a method of wireless communication.

FIG. 12 is a flowchart 1200 of a method of wireless communication. The method may be performed by a UE (e.g., the UE 104, 350, 404, 508, 802, 1050; the apparatus 1302/1302'; the processing system 1414, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The UE may implement the method of diagram 1200. Optional aspects are illustrated with a dashed line. The method may help the UE to have an enhanced power management by optimizing the UE's operation of DRX.

At 1202, the UE may receive a first DRX group for a first set of serving cells. For example, 1202 may be performed by first DRX component 1306 of apparatus 1302. The first set of serving cells may comprise a PCell configured for the UE. The UE may be configured to communicate with the first cell (e.g., the PCell) from the first set of serving cells using a first frequency range. In some examples, the first frequency range comprises a sub-6 GHz frequency range. The UE may be configured with the first DRX configuration on RRC signaling or by MAC-CE. The RRC signaling may comprise an IE including a list of DRX groups and respective DRX parameters. The UE may be configured to receive an index associated with the first DRX group from the plurality of DRX groups. In some examples, the index may be received by the UE in a MAC-CE sent via PDCCH of the first serving cell. The UE may be configured to support CA such that the UE 1202 may communicate with the base station via a PCell and an SCell, in accordance with the system 500 of FIG. 5

At 1204, the UE may receive a second DRX group for a second set of serving cells. For example, 1204 may be performed by second DRX component 1308 of apparatus 1302. The second set of serving cell may include an SCell configured for the UE. The UE may be configured to communicate with the second cell (e.g., SCell) from the second set of serving using a second frequency range. In some examples, the second frequency range comprises a mmW frequency range. The UE may be configured with the second DRX configuration on RRC signaling or by MAC-CE. The RRC signaling may comprise an IE including a list of DRX groups and respective DRX parameters. FIG. 8 illustrates an example 812 of the UE receiving a signal from the base station. The signal provides an indication of the first DRX group and the second DRX group to the UE. Upon receipt of the signal 812, the UE 802 may use the configurations to enter the first DRX mode and/or the second DRX mode.

At 1206, the UE may be configured to enter a DRX mode. For example, 1206 may be performed by DRX mode component 1310 of apparatus 1302. Entering the DRX mode may be based on the first DRX configuration for the first set of serving cells and/or the second DRX configuration for the second set of serving cells. FIG. 8 illustrates an example 814 of the UE entering the first DRX mode and the second DRX mode.

In some aspects, for example, at 1208, the UE may be configured to receive a signal of DRX parameters for each of the plurality of DRX groups from a base station. For example, 1208 may be performed by reception component 1304 of apparatus 1302. The DRX parameters may be signaled in RRC signaling and may comprise an IE including a list of DRX groups and respective DRX parameters. Although illustrated following 1206, the UE may receive the signaling at 1208 prior to the receipt of the configurations of 1202, 1204.

In some aspects, for example, at 1210, the UE may be configured to receive a WUS. For example, 1210 may be performed by wake up component 1312 of apparatus 1302. The WUS, in some aspects, may be from the first serving cell, for the second DRX group. In some examples, the UE may receive the WUS before a DRX on duration of any of a plurality of DRX groups. The WUS may provide an indication for the serving cells in a desired DRX group to enter a power active state. In some examples, each of the plurality of DRX groups may be associated with a unique WUS. In some examples, a single WUS sequencemay be configured for the UE. In such examples, the WUS may comprise a bitmap to indicate which DRX group is to be activated. However, the WUS may be configured in other manners and the disclosure is not intended to be limited to a sequence based WUS.

Figure 13:
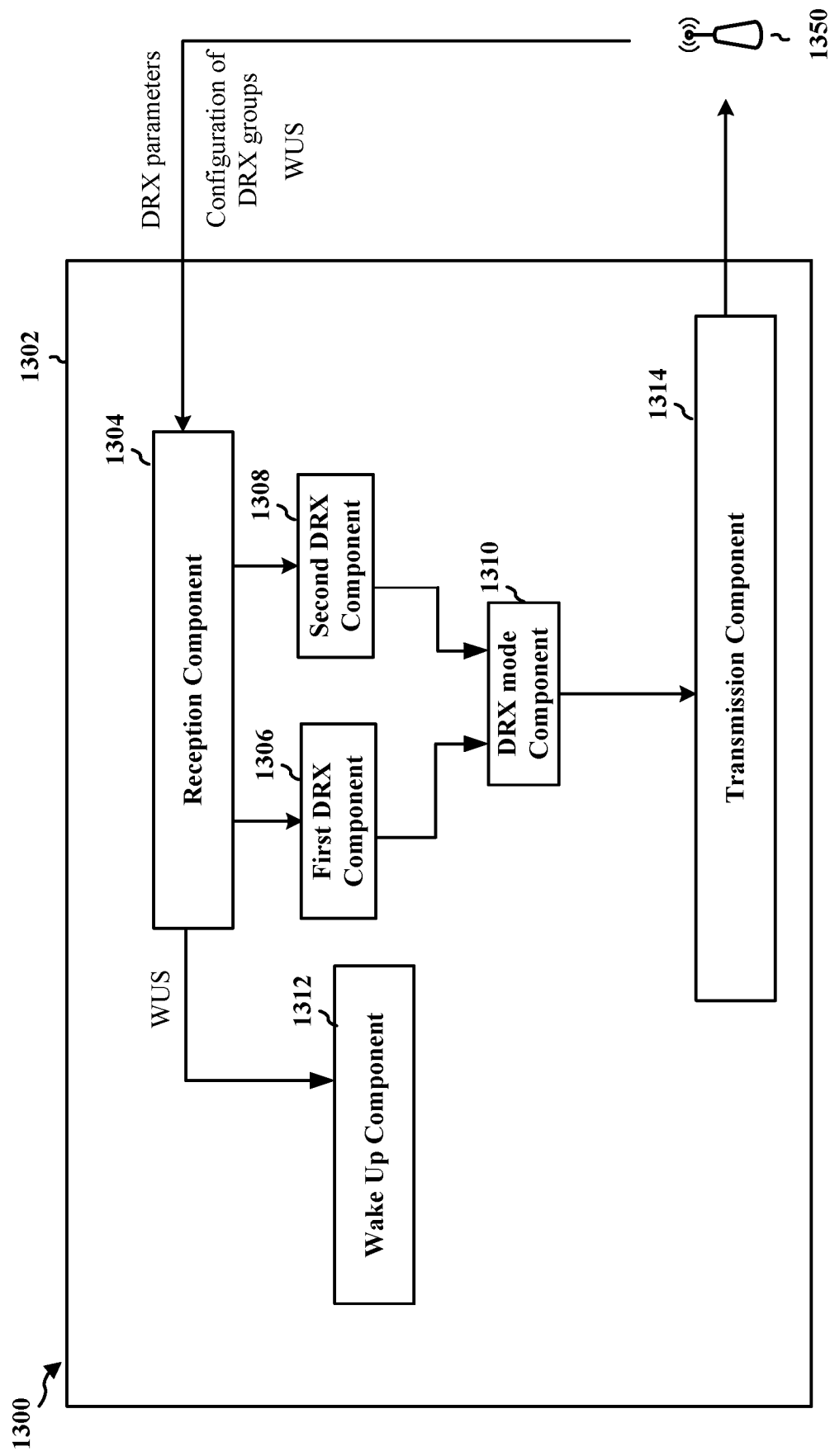
FIG. 13 is a conceptual data flow diagram illustrating the data flow between different means/components in an exemplary apparatus.

FIG. 13 is a conceptual data flow diagram 1300 illustrating the data flow between different means/components in an example apparatus 1302. The apparatus may be a UE or a component of a UE (e.g., UE 104, 350, 404, 508, 802, 1050, apparatus 1302/1302') communicating with a base station (e.g., the base station 102, 180, 310, 402, 502, 604, 1350, apparatus 1002/1002').

The apparatus includes a reception component 1304 that may be configured to receive a signal of DRX parameters for each of the plurality of DRX groups from a base station, e.g., as described in connection with 1208 of FIG. 12. The apparatus includes a first DRX component 1306 that may be configured to receive the first DRX group for a first set of serving cells, e.g., as described in connection with 1202 of FIG. 12. The apparatus includes a second DRX component 1308 that may be configured to receive the second DRX configuration of the second DRX group for a second set of serving cells, e.g., as described in connection with 1204 of FIG. 12. The apparatus includes a DRX mode component 1310 that is configured to cause the apparatus to enter DRX mode, e.g., as described in connection with 1206 of FIG. 12. The apparatus includes a wake up component 1312 that is configured to receive a signal, e.g., as described in connection with 1210 of FIG. 12. The apparatus includes a transmission component 1314 that may be configured to transmit uplink communications to base station 1350.

The apparatus may include additional components that perform each of the blocks of the algorithm in the aforementioned flowcharts of FIG. 12. As such, each block in the aforementioned flowcharts of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
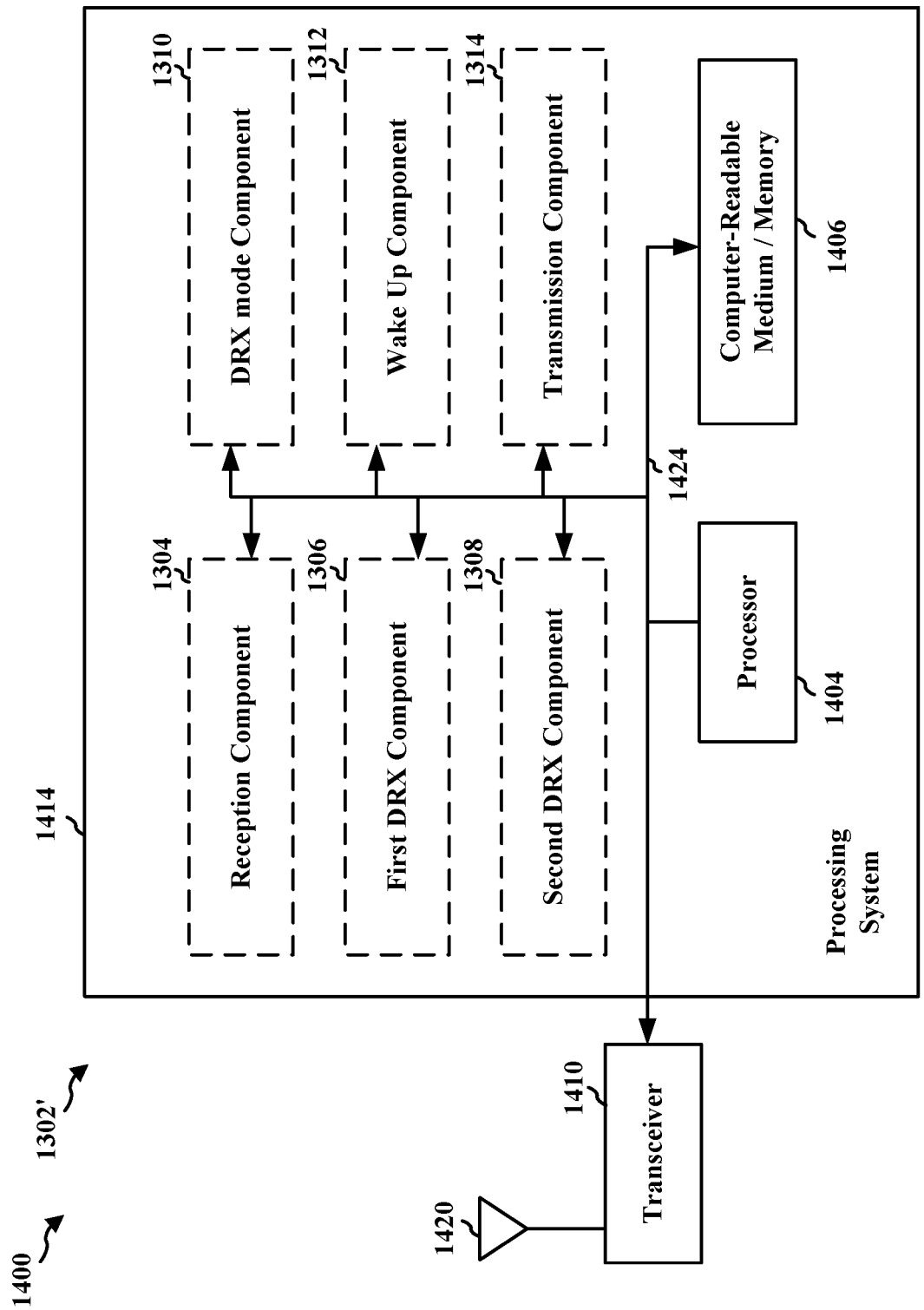
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314 and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1314, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359. Alternatively, the processing system 1414 may be the entire UE (e.g., see 350 of FIG. 3).

In one configuration, the apparatus 1302/1302' for wireless communication includes means for receiving a first DRX group for a first set of serving cells. The apparatus includes means for receiving a second DRX group for a second set of serving cells. The apparatus includes means for entering a DRX mode based on at least one of the first DRX configuration for the first set of serving cells and the second DRX configuration for the second set of serving cells. The apparatus further includes means for receiving a signal from one of the first set of serving cells. The signal provides an indication for the UE to change a power off-state of serving cells in the second DRX group to a power on-state. The apparatus further includes means for receiving a WUS for the second DRX group using the first set of serving cells. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, the method comprising:
   determining a first discontinuous reception (DRX) configuration and a second DRX configuration for a plurality of DRX groups for communicating with a user equipment (UE);
   configuring the UE with the first DRX configuration indicating a first DRX group of the plurality of DRX groups for a first set of serving cells; and
   configuring the UE with the second DRX configuration indicating a second DRX group of the plurality of DRX groups for a second set of serving cells, wherein the UE is configured with DRX parameters associated with the second DRX configuration from among DRX parameters included in the first DRX configuration and the second DRX configuration by indicating an index of the second DRX group in an information element (IE) sent via radio resource control (RRC) signaling.

2. The method of claim 1, further comprising:
   transmitting a wakeup signal (WUS) to the UE, wherein the WUS is transmitted before a DRX on duration of any of the plurality of DRX groups such that the WUS provides an indication for serving cells in a desired DRX group to enter a power active state.

3. The method of claim 2, wherein each of the plurality of DRX groups is associated with a unique WUS.

4. The method of claim 2, further comprising configuring the UE with a single WUS, wherein the single WUS comprises a bitmap indicating which of the plurality of DRX groups is to be activated.

5. The method of claim 2, wherein the WUS causes the UE to change serving cells into a DRX group associated with the WUS to enter the power active state.

6. The method of claim 2, wherein each of the plurality of DRX groups operate in accordance with their respective DRX configurations until a time after an associated WUS is transmitted to the UE.

7. The method of claim 1, wherein the first set of serving cells comprise a primary cell (PCell) and the second set of serving cells comprise a secondary cell (SCell).

8. The method of claim 1, wherein the first set of serving cells communicate with the UE using a first frequency range and the second set of serving cells communicate with the UE using a second frequency range.

9. The method of claim 8, wherein the first frequency range comprises a sub-6 GHZ frequency range and the second frequency range comprises a millimeter Wave (mmW) frequency range.

10. The method of claim 1, further comprising signaling DRX parameters for each of the plurality of DRX groups to the UE.

11. The method of claim 10, wherein the DRX parameters are signaled in the RRC signaling comprising the IE indicating the plurality of DRX groups and respective DRX parameters.

12. The method of claim 10, wherein the UE is configured with a first DRX configuration by indicating an index of the first DRX group from among the plurality of DRX groups.

13. The method of claim 12, wherein the index of the first DRX group is comprised in an Information Element (IE) in a serving cell configuration for the first set of serving cells.

14. The method of claim 12, wherein the index of the first DRX group is comprised in a medium access control-control element (MAC-CE) sent via Physical Downlink Control Channel (PDCCH) of the first set of serving cells.

15. The method of claim 12, wherein the index of the first DRX group is comprised in a medium access control-control element (MAC-CE) comprising paired parameters, wherein the paired parameters provides an indication to the UE of a new cell index and a new DRX group of an active serving cell.

16. The method of claim 1, further comprising:
   transmitting a signal in one of the first set of serving cells to the UE, wherein the signal provides an indication for the UE to change a power off-state of serving cells in the second DRX group to a power on-state.

17. The method of claim 16, wherein the signal comprises the index of the second DRX group to be activated.

18. The method of claim 16, wherein the signal comprises at least one of a cross carrier downlink control information (DCI) or a medium access control-control element (MAC-CE).

19. The method of claim 1, wherein a first DRX cycle of the first DRX configuration is an integer multiple of a second DRX cycle of the second DRX configuration.

20. The method of claim 1, further comprising transmitting, to the UE through an active carrier in the first DRX group, a signal that triggers the UE to activate the second DRX group at a time prior to a next scheduled DRX on duration of the second DRX group.

21. The method of claim 1, wherein a first on-state of the first DRX configuration is aligned with a second on-state of the second DRX configuration.

22. The method of claim 1, wherein each of the first DRX configuration and the second DRX configuration comprises a first set of DRX parameters that is commonly configured between the first DRX group and the second DRX group and a second set of DRX parameters that is configured differently between the first DRX group and the second DRX group.

23. An apparatus for wireless communication, comprising:
   a memory; and
   at least one processor coupled to the memory and configured to:
      determine a first discontinuous reception (DRX) configuration and a second DRX configuration for a plurality of DRX groups for communicating with a user equipment (UE);
      configure the UE with the first DRX configuration indicating a first DRX group of the plurality of DRX groups for a first set of serving cells; and
      configure the UE with the second DRX configuration indicating a second DRX group of the plurality of DRX groups for a second set of serving cells, wherein the UE is configured with DRX parameters associated with the second DRX configuration from among DRX parameters included in the first DRX configuration and the second DRX configuration by indicating an index of the second DRX group in an information element (IE) sent via radio resource control (RRC) signaling.

24. A method of wireless communication at a User Equipment (UE), comprising:
   receiving a first discontinuous reception (DRX) configuration indicating a first DRX group of a plurality of DRX groups for a first set of serving cells;
   receiving a second DRX configuration indicating a second DRX group of the plurality of DRX groups for a second set of serving cells, wherein the UE is configured with DRX parameters associated with the second DRX configuration from among DRX parameters included in the first DRX configuration and the second DRX configuration based on an index of the second DRX group, wherein the index of the second DRX group is comprised in an information element (IE) received via radio resource control (RRC) signaling; and entering a DRX mode based on at least one of the first DRX configuration for the first set of serving cells and the second DRX configuration for the second set of serving cells.

25. The method of claim 24, further comprising:

receiving, from a base station, downlink signaling indicating DRX parameters for each of the plurality of DRX groups.

26. The method of claim 25, wherein the DRX parameters are signaled in the RRC signaling comprising the IE indicating the plurality of DRX groups and respective DRX parameters.

27. The method of claim 25, wherein receiving the first DRX configuration comprises receiving an index associated with the first DRX group.

28. The method of claim 24, further comprising:

receiving a signal from one of the first set of serving cells, wherein the signal provides an indication for the UE to change a power off-state of serving cells in the second DRX group to a power on-state.

29. The method of claim 24, further comprising:

receiving a wakeup signal (WUS), wherein the WUS is received before a DRX on duration of any of the plurality of DRX groups such that the WUS provides an indication for the UE to enter a power on-state on a desired DRX group.

30. The method of claim 29, wherein each of the plurality of DRX groups is associated with a unique WUS.

31. The method of claim 24, wherein the first set of serving cells communicate with the UE using a first frequency range and the second set of serving cells communicate with the UE using a second frequency range.

32. The method of claim 31, wherein the first frequency range comprises a sub-6 GHZ frequency range and the second frequency range comprises a millimeter Wave (mmW) frequency range.

33. The method of claim 24, wherein a first DRX cycle of the first DRX configuration is an integer multiple of a second DRX cycle of the second DRX configuration.

34. The method of claim 24, further comprising receiving, from a base station through an active carrier in the first DRX group, a signal that triggers the UE to activate the second DRX group at a time prior to a next scheduled DRX on duration of the second DRX group.

35. An apparatus for wireless communication, comprising:

a memory; and at least one processor coupled to the memory and configured to:

receive a first discontinuous reception (DRX) configuration indicating a first DRX group of a plurality of DRX groups for a first set of serving cells;

receive a second DRX configuration indicating a second DRX group of the plurality of DRX groups for a second set of serving cells, wherein the apparatus is configured with DRX parameters associated with the second DRX configuration from among DRX parameters included in the first DRX configuration and the second DRX configuration based on an index of the second DRX group, wherein the index of the second DRX group is comprised in an information element (IE) received via radio resource control (RRC) signaling; and enter a DRX mode based on at least one of the first DRX configuration for the first set of serving cells and the second DRX configuration for the second set of serving cells.

* * * * *